(12) United States Patent
Jeon et al.

(10) Patent No.: US 10,003,106 B2
(45) Date of Patent: Jun. 19, 2018

(54) APPARATUS AND METHOD FOR MANAGING BATTERY

(71) Applicants: Samsung Electronics Co., Ltd., Suwon-si (KR); Research & Business Foundation SUNGKYUNKWAN UNIVERSITY, Suwon-si (KR)

(72) Inventors: Jinyong Jeon, Yongin-si (KR); Taejung Yeo, Yongin-si (KR); Seong Chon Choi, Namyangju-si (KR); Soon Ryung Lee, Anyang-si (KR); Bong Yeon Choi, Yongin-si (KR)

(73) Assignees: Samsung & Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 239 days.

(21) Appl. No.: 14/819,679

(22) Filed: Aug. 6, 2015

(65) Prior Publication Data

US 2016/0105039 A1 Apr. 14, 2016

(30) Foreign Application Priority Data

Oct. 14, 2014 (KR) .......................... 10-2014-0138550

(51) Int. Cl.
*H01M 10/44* (2006.01)
*H01M 10/42* (2006.01)
*H02J 7/00* (2006.01)
*H01M 10/48* (2006.01)

(52) U.S. Cl.
CPC ......... *H01M 10/425* (2013.01); *H01M 10/44* (2013.01); *H01M 10/48* (2013.01); *H02J 7/0065* (2013.01); *H01M 2010/4271* (2013.01); *H02J 2007/0067* (2013.01)

(58) Field of Classification Search
CPC ................................ H02J 7/007; H02J 7/0016
USPC .................................................. 320/127–128
See application file for complete search history.

(56) References Cited

U.S. PATENT DOCUMENTS

| 8,115,446 | B2 | 2/2012 | Piccard et al. | |
| 8,129,952 | B2 * | 3/2012 | Lee ....................... | H02J 7/0016 307/80 |
| 8,315,828 | B2 * | 11/2012 | Tae ..................... | H01M 10/482 320/134 |
| 8,354,825 | B2 | 1/2013 | Lee et al. | |
| 8,541,905 | B2 | 9/2013 | Brabec | |
| 8,798,832 | B2 * | 8/2014 | Kawahara .......... | H01M 10/441 701/22 |

(Continued)

FOREIGN PATENT DOCUMENTS

| JP | 4130186 B2 | 5/2008 |
| JP | 2010-115048 A | 5/2010 |

(Continued)

*Primary Examiner* — Samuel Berhanu
*Assistant Examiner* — Tessema Kebede
(74) *Attorney, Agent, or Firm* — NSIP Law

(57) ABSTRACT

An apparatus and method for managing a battery are disclosed. The apparatus may include a state verifier configured to verify respective states of charge (SoCs) of batteries to be balanced by the apparatus, and a controller configured to control power converters configured to convert respective amounts of power of the batteries to allow a greater amount of power to be output from a battery having a greater SoC among the batteries.

15 Claims, 5 Drawing Sheets

(56) References Cited

U.S. PATENT DOCUMENTS

| | | | |
|---|---|---|---|
| 8,963,501 B2* | 2/2015 | Shigemizu | H01M 10/441 320/126 |
| 2011/0089898 A1 | 4/2011 | Lee et al. | |
| 2012/0262106 A1* | 10/2012 | Omiya | B60R 16/03 320/104 |
| 2012/0319652 A1 | 12/2012 | Namou et al. | |
| 2013/0038289 A1* | 2/2013 | Tse | H02M 3/158 320/118 |
| 2013/0193768 A1* | 8/2013 | Iwasaki | H02J 3/32 307/85 |
| 2014/0145669 A1 | 5/2014 | Wortham | |
| 2014/0152258 A1 | 6/2014 | LePort et al. | |

FOREIGN PATENT DOCUMENTS

| | | |
|---|---|---|
| KR | 10-2011-0054135 A | 5/2011 |
| KR | 10-1122598 B1 | 3/2012 |
| KR | 10-1165593 B1 | 7/2012 |
| KR | 10-1247282 B1 | 3/2013 |

\* cited by examiner

APPARATUS AND METHOD FOR MANAGING BATTERY

CROSS-REFERENCE TO RELATED APPLICATION

This application claims the benefit under 35 USC § 119(a) of Korean Patent Application No. 10-2014-0138550, filed on Oct. 14, 2014, in the Korean Intellectual Property Office, the entire disclosure of which is incorporated herein by reference for all purposes.

BACKGROUND

1. Field

The following description relates to an apparatus and a method for managing a battery.

2. Description of Related Art

Recently, technology for simultaneously handling an environmental issue and an energy resources issue in, for example, electric automobiles and bicycles, has been receiving added attention. For such electric automobiles and bicycles, managing a battery accurately and effectively may be vital.

However, when cells included in the battery are repetitively charged and discharged, a voltage deviation may occur between the cells and a certain cell may be overcharged or over-discharged. Thus, a capacity and a lifespan of the battery may be reduced due to deterioration of the battery.

Accordingly, there is a desire for technology for effectively using a battery based on battery balancing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a battery managing apparatus including a state verifier configured to verify respective states of charge (SoCs) of batteries to be balanced by the battery managing apparatus, and a controller configured to control power converters configured to convert respective amounts of power of the batteries to allow a greater amount of power to be output from a battery having a greater SoC among the batteries.

The controller may set a compensation value using a maximum value and a minimum value of the SOCs of the batteries, and control the power converters based further on the compensation value.

A difference between the maximum value and the minimum value of the SOCs of the batteries may be restricted to allow an amount of output power of the power converters to remain within a predetermined range.

The compensation value may be set to allow a total amount of power to be output from the power converters to be maintained at a same amount.

The compensation value may be set based on an order of magnitudes of the SOCs of the batteries.

The state verifier may further verify respective states of health (SOHs) of the batteries, and the controller may control a power converter, among the power converters, connected to a corresponding battery among the batteries, based on an overall SOC and an overall SOH of the batteries, and an SOC and an SOH of the corresponding battery.

Output terminals of the power converters may be connected in series or in parallel.

When the amount of the output power of the power converters deviates from a predetermined range, the controller may restrict the amount of the output power of the power converters to a predetermined value.

In another general aspect, there is provided a battery managing method to be performed by a battery managing apparatus, the method including verifying respective SoCs of batteries to be balanced by the battery managing apparatus, and controlling power converters configured to convert respective amounts of power of the batteries to allow a greater amount of power to be output from a battery having a greater SoC among the batteries.

The controlling may include setting a compensation value using a maximum value and a minimum value of the SoCs of the batteries and controlling the power converters based further on the compensation value.

The battery managing method may include restricting a difference between the maximum value and the minimum value of the SOCs of the batteries to allow an amount of output power of the power converters to remain within a predetermined range.

The compensation value may be set to allow a total amount of power to be output from the power converters to be maintained at a same amount.

The compensation value may be set based on an order of magnitudes of the SOCs of the batteries.

The verifying may include further verifying respective states of health (SoHs) of the batteries, and the controlling may include controlling a power converter, among the power converters, connected to a corresponding battery among the batteries, based on an overall SoC and an overall SoH of the batteries, and an SoC and an SoH of the corresponding battery.

Output terminals of the power converters may be connected in series or in parallel.

When an amount of output power of the power converters deviates from a predetermined range, the controlling may include restricting the amount of the output power of the power converters to a predetermined value.

According to another general aspect, a non-transitory computer-readable storage medium may include a program including instructions to cause a computer to perform the battery managing method.

According to another general aspect, a battery managing apparatus may include a controller configured to control a power supply apparatus to convert respective amounts of power of batteries based on a comparison of respective states of charge (SOCs) of the batteries in order to balance the SOCs of the batteries.

The controller may be configured to set respective compensation values for power converters corresponding to the batteries using a maximum value and a minimum value of the SOCs of the batteries, and control the power converters based on the respective compensation values in order to convert the respective amounts of power of the batteries.

The respective compensation values may be set such that the respective amounts of power of the batteries are proportional to the respective SOCs of the batteries.

Other features and aspects will be apparent from the following detailed description, the drawings, and the claims.

Figure 1:
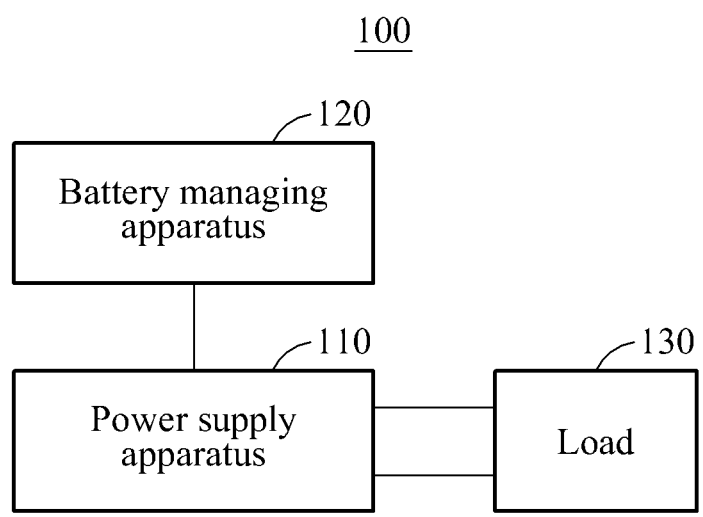
FIG. 1 is a diagram illustrating an example battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an example battery system 100.

Referring to FIG. 1, the battery system 100 includes a power supply apparatus 110, a battery managing apparatus 120, and a load 130. For example, the battery system 100 may refer to an energy storage system (ESS).

The power supply apparatus 110 supplies power to the load 130. The power supply apparatus 110 may include a plurality of power converters configured to convert respective amounts of power of batteries.

Each battery may indicate a battery module or a battery cell. The battery module may include a plurality of battery cells. The battery cells included in the battery module may be connected in series. For example, the battery may be a secondary battery such as a lithium-ion battery. Capacities and voltages of the batteries may be equivalent or differing.

The power supply apparatus 110 may convert the power of the batteries using the power converters, and transmit the power to the load 130.

A power converter may be an apparatus configured to convert an amount of power of a battery. For example, the power converters may convert power of each battery and output the power obtained through the converting. For example, a power converter may be connected to a corresponding battery, and convert power of the corresponding battery. Output terminals of the power converters may be connected to one another in series or in parallel. In a case of a series connection of the output terminals of the power converters, the power converters may convert respective voltages of the batteries to convert the respective amounts of power of the batteries. Conversely, in a case of a parallel connection of the output terminals of the power converters, the power converters may convert respective currents of the batteries to convert the respective amounts of power of the batteries. However, other configurations are possible for connection of the power converters and batteries and connection of the output terminals of the power converters.

The battery managing apparatus 120 is an apparatus configured to control the power converters included in the power supply apparatus 110. For example, the battery managing apparatus 120 may verify respective states of charge (SoCs) and respective states of health (SoHs) of the batteries, and control the power converters based on the verified SoCs and SoHs.

The battery managing apparatus 120 may control an amount of power to be transmitted from the batteries to the load 130 by controlling the power converters included in the power supply apparatus 110. For example, in a case of the output terminals of the power converters being to each other in series, the battery managing apparatus 120 may control the amount of power to be transmitted from the batteries to the load 130 by controlling output voltages of the power converters obtained by converting the respective voltages of the batteries. Alternatively, in a case of the output terminals of the power converters being connected to each other in parallel, the battery managing apparatus 120 may control the amount of power to be transmitted from the batteries to the load 130 by controlling output currents of the power converters obtained by converting the respective currents of the batteries.

The battery managing apparatus 120 may control the power converters to allow a greater amount of power to be output from a battery having a greater SoC among the batteries, in comparison to an amount of power output from a battery having a lesser SoC among the batteries. Further, the battery managing apparatus 120 may set a compensation value using a maximum value and a minimum value of the SoCs of the batteries, and control the power converters based further on the compensation value.

The battery managing apparatus 120 may refer to a battery management system (BMS) that manages the batteries through the power converters. For example, the battery managing apparatus 120 may perform thermal control on the batteries. The battery managing apparatus 120 may prevent the batteries from being overcharged and over-discharged, and control the SOCs of the batteries to be equalized by performing balancing. Here, a state of each battery may include at least one of an SOC, an SOH, and a state of function (SOF).

In addition, the battery managing apparatus 120 may estimate respective SOCs, SOHs, and SOFs of the batteries. Here, the SOC may indicate information on an amount of charge accepted by a battery. The SOH may indicate information on a degree of deterioration in performance of a battery in comparison to initial performance at a manufacturing time. The SOF may indicate information on a degree of satisfaction of a performance of a battery with a predetermined condition.

The battery managing apparatus 120 may provide an electronic control unit (ECU) with at least one of the SOC, the SOH, and the SOF. For example, the battery managing apparatus 120 may communicate with the ECU through a controller area network (CAN).

The battery managing apparatus 120 may set different compensation values for the power converters. For example, the battery managing apparatus 120 may set different compensation values for the power converters to change based on the SoCs of the batteries.

The battery managing apparatus 120 may set the compensation values based on a maximum value and a minimum value of the SOCs of the batteries. In an example, the battery managing apparatus 120 may set the compensation values based on a difference between the maximum value and the minimum value of the SOCs of the batteries. The difference between the maximum value and the minimum value of the SOCs of the batteries may be restricted to allow the output voltages of the power converters to remain within a predetermined range. The battery managing apparatus 120 may control the output voltages of the power converters to allow the output voltages of the power converters not to be greater than an upper limit value or less than a lower limit value of an output voltage.

The battery managing apparatus 120 may set the compensation values to allow a total amount of power to be output from the power converters to be maintained. Although the output voltages of the power converters are controlled based on the compensation values, the battery managing apparatus 120 may set the compensation values in order for the total amount of power to be output from the power converters not to increase or decrease.

The battery managing apparatus 120 may set the compensation values based on an order of magnitudes of the SOCs of the batteries. More specifically, the battery managing apparatus 120 may set the compensation values in proportion to the respective SOCs of the batteries. For example, when a battery A has a largest SOC, a battery B has a second largest SOC, and a battery C has a smallest SOC, the battery managing apparatus 120 may set the compensation values to allow a compensation value for the battery A to be greater than a compensation value for the battery B. Similarly, the battery managing apparatus 120 may set the compensation values to allow the compensation value for the battery B to be greater than a compensation value for the battery C.

A sum of the different compensation values set by the battery managing apparatus 120 may be "0." When the respective compensation values corresponding to the batteries are set according to the order of magnitudes of the SOCs of the batteries, magnitudes of the different compensation values may have a bisymmetrical form, and signs of compensation values on a left and a right based on a center may be different.

For a battery having a greater SOC among the batteries, the battery managing apparatus 120 may set the compensation values to allow an amount of power to be transmitted from the battery to the load 130 to increase. For example, when the SOC of the battery A is greater than the SOC of the battery B and the SOC of the battery B is greater than the SOC of the battery C, the battery managing apparatus 120 may set the compensation values to allow an amount of power to be output from the battery A to the load 130 to be greater than an amount of power to be output from the battery B to the load 130. Similarly, the battery managing apparatus 120 may set the compensation values to allow the amount of power to be output from the battery B to the load 130 to be greater than an amount of power to be output from the battery C to the load 130.

The battery managing apparatus 120 may control magnitudes of the output voltages of the power converters based on at least one of the respective SOCs and the respective SOHs of the batteries.

The battery managing apparatus 120 may control an output voltage of a power converter desired to be controlled based on the SoCs of the batteries and an SoC of a battery corresponding to the power converter desired to be controlled. For example, when the battery managing apparatus 120 desires to control a power converter D and the battery A is connected to the power converter D, the battery managing apparatus 120 may control the power converter D based on the SoC of the batteries and an SoC of the battery A.

For a battery having a greater SOC among the batteries, the battery managing apparatus 120 may control an output voltage to be output from a power converter corresponding to the battery to increase. For example, when the SOC of the battery A is greater than the SOC of the battery B and the SOC of the battery B is greater than the SOC of the battery C, and the power converter D is connected to the battery A, a power converter E is connected to the battery B, and a power converter F is connected to the battery C, the battery managing apparatus 120 may control the power converter D and the power converter E to allow an output voltage to be output from the power converter D to be greater than an output voltage to be output from the power converter E. Similarly, the battery managing apparatus 120 may control the power converter E and the power converter F to allow an output voltage to be output from the power converter E to be greater than an output voltage to be output from the power converter F.

The battery managing apparatus 120 may control a magnitude of an output voltage of a power converter connected to a corresponding battery based on an overall SOC and an overall SOH of the batteries and an SOC and an SOH of the corresponding battery. The overall SOC may indicate all of the respective SOCs of the batteries, and the overall SOH may indicate all of the respective SOHs of the batteries. The corresponding battery may indicate a battery corresponding to the power converter desired to be controlled by the battery managing apparatus 120.

When at least one of the output voltages of the controlled power converters deviates from a predetermined range, the battery managing apparatus 120 may restrict the at least one output voltage that deviates from the predetermined range to a predetermined value.

For example, when at least one of the output voltages is greater than an upper limit value of the predetermined range, the battery managing apparatus 120 may restrict the at least one output voltage that deviates from the predetermined range to the upper limit value. Also, when at least one of the output voltages is less than a lower limit value of the predetermined range, the battery managing apparatus 120 may restrict the at least one output value to the lower limit value.

Figure 2:
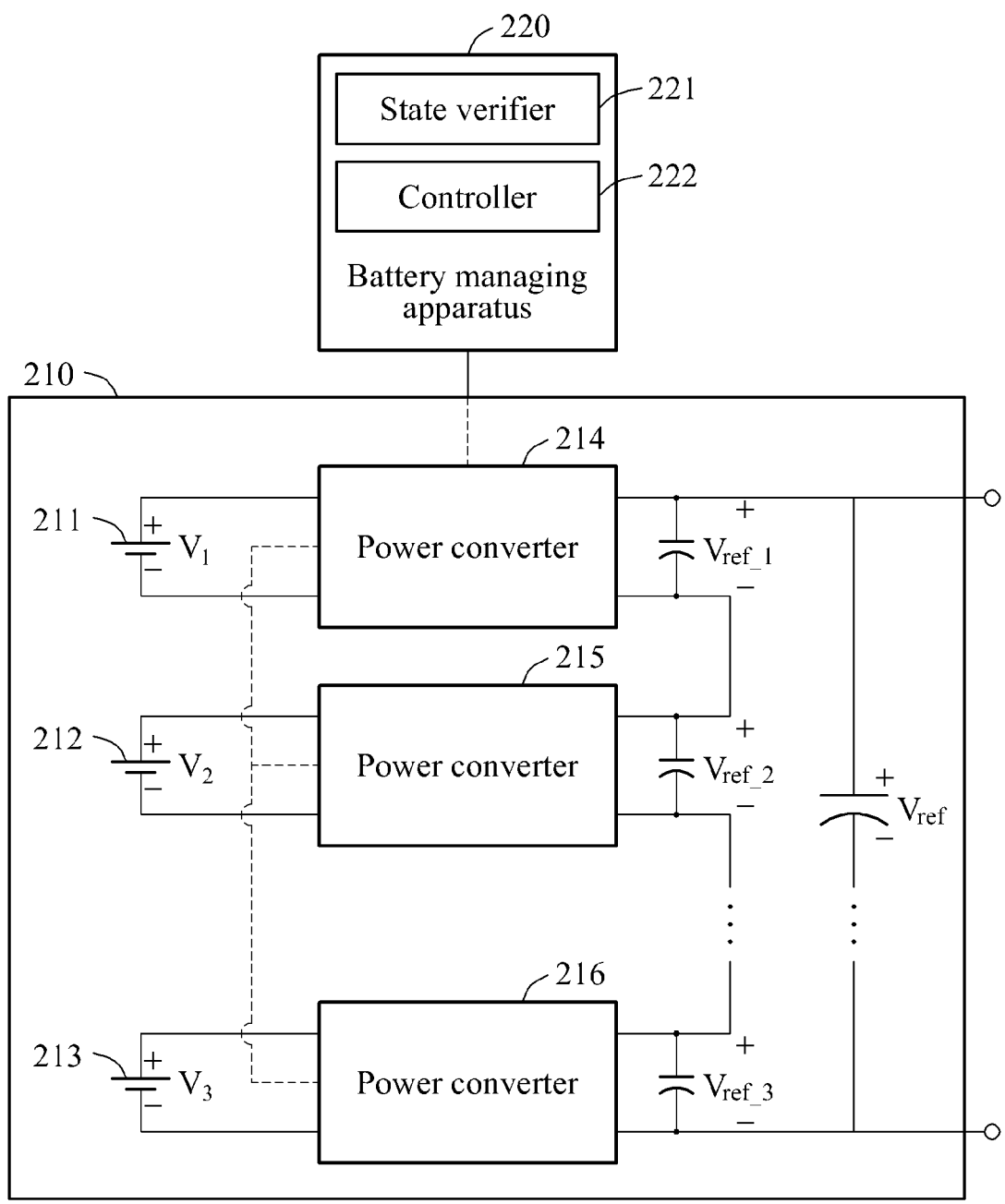
FIG. 2 is a diagram illustrating an example operation of a battery managing apparatus.

FIG. 2 is a diagram illustrating an example operation of a battery managing apparatus 220.

FIG. 2 illustrates a power supply apparatus 210 and the battery managing apparatus 220. Referring to FIG. 2, the power supply apparatus 210 includes a plurality of batteries, for example, a battery 211, a battery 212, and a battery 213, and a plurality of power converters, for example, a power converter 214, a power converter 215, and a power converter 216. Input terminals of the power converters 214 through 216 are connected to corresponding batteries 211 through 213, and output terminals of the power converters 214 through 216 are connected to one another in series.

The battery managing apparatus 220 includes a state verifier 221 and a controller 222. The battery managing apparatus 220 may control power to be transmitted from the batteries 211 through 213 to a load by controlling output voltages of the power converters 214 through 216.

Each of the batteries 211 through 213 may indicate a battery module or a battery cell. The battery module may include a plurality of battery cells. The battery cells included in the battery module may be connected in series.

For example, each battery may be a secondary battery such as a lithium-ion battery. Capacities or voltages of the batteries 211 through 213 may be equivalent or differing.

The power converters 214 through 216 may be devices to convert respective voltages of the corresponding batteries 211 through 213, and output respective output voltages by converting the voltages of the corresponding batteries 211 through 213. The output terminals of the power converters 214 through 216 may be connected in series. For example, the power converter 214 may be connected to the power converter 215, and the power converter 215 may be connected to the power converter 216. The power converters 214 through 216 connected in series may be connected to the load.

For example, the power converter 214 may output an output voltage ($V_{ref\_1}$) obtained by converting a voltage ($V_1$) of the battery 211 and store the output voltage $V_{ref\_1}$ in a capacitor connected to an output terminal. The power converter 215 may output an output voltage ($V_{ref\_2}$) obtained by converting a voltage ($V_2$) of the battery 212 and store the output voltage $V_{ref\_2}$ in a capacitor connected to an output terminal. Similarly, the power converter 216 may output an output voltage ($V_{ref\_3}$) obtained by converting a voltage ($V_3$) of the battery 213 and store the output voltage $V_{ref\_3}$ in a capacitor connected to an output terminal. Due to the series connection of the output terminals of the power converters 214 through 216, the capacitors of the power converters 214 through 216 may be connected in series and thus, a total output voltage ($V_{ref}$) may be a sum of the output voltages $V_{ref\_1}$, $V_{ref\_2}$, and $V_{ref\_3}$ of the power converters 214 through 216 and the total output voltage may be transmitted to the load.

The respective output voltages of the power converters 214 through 216 may be controlled by the battery managing apparatus 220. The output voltages of the power converters 214 through 216 may be equal to or different from one another. However, respective output currents of the power converters 214 through 216 may be equal to one another because the output terminals of the power converters 214 through 216 are connected in series.

In an example, each of the power converters 214 through 216 may include a plurality of direct current to direct current (DC/DC) converters. The DC/DC converters included in each of the power converters 214 through 216 may be connected in parallel. The battery managing apparatus 220 may control the output voltages of the power converters 214 through 216 by controlling the DC/DC converters. For example, each of the DC/DC converters may be a boost converter.

The state verifier 221 of the battery managing apparatus 220 may verify respective states of the batteries 211 through 213. For example, the state verifier 221 may verify respective SOCs, SOHs, and SOFs of the batteries 211 through 213. The batteries 211 through 213 may be balanced by the battery managing apparatus 220.

The controller 222 of the battery managing apparatus 220 may control the output voltages of the power converters 214 through 216 based on the states of the batteries 211 through 213. In addition, the controller 242 may control the output voltages of the power converters 214 through 216 based further on compensation values to be set to allow the output voltages of the power converters 214 through 216 to be output proportionally to the respective SOCs of the batteries 211 through 213.

The controller 222 may control the output voltages of the power converters 214 through 216 as expressed in Equation 1.

$$V_{ref\_i} = \frac{SOC_h(i)}{\sum_{i=1}^{i=N} SOC_h(i)} V_{DC\_Link} + SOC_{diff} * k(i) \quad \text{[Equation 1]}$$

In Equation 1, "$V_{ref\_i}$" denotes an output voltage of a power converter that converts a voltage of an i-th battery. The i-th battery may indicate a battery having an i-th largest SOC when being arranged in an order of the SOCs of the batteries 211 through 213. "$SOC_h(i)$" denotes an SOC of the i-th battery in which an SOH of the i-th battery is reflected. "$V_{DC\_Link}$" denotes a total output voltage output from the power converters 214 through 216, and the voltage to be ultimately transmitted to the load. "$SOC_{diff}$" denotes a difference between a maximum value and a minimum value of the SOCs of the batteries 211 through 213. "k(i)" denotes a compensation factor corresponding to the i-th battery. "N" denotes a number of the batteries 211 through 213 to be balanced by the battery managing apparatus 220.

The $SOC_h(i)$ may be expressed as Equation 2.

$$SOC_h(i) = SOC(i) * SOH(i) \quad \text{[Equation 2]}$$

In Equation 2, "SOC(i)" and "SOH(i)" denote the SOC and the SOH of the i-th battery, respectively.

"$SOC_{diff} * k(i)$" denotes feedforward compensation of the i-th battery. Since the $SOC_{diff}$ denotes the difference between the maximum value and the minimum value of the SOCs of the batteries 211 through 213, values of the $SOC_{diff}$ to be applied to the batteries 211 through 213 may be equal to one another.

Here, a range of the $SOC_{diff}$ may be restricted to protect the batteries 211 through 213. The $SOC_{diff}$ may be restricted to allow the output voltages of the power converters 214 through 216 to remain within a predetermined range. For example, the controller 222 may restrict the $SOC_{diff}$ to allow the output voltages of the power converters 214 through 216 not to be greater than an upper limit value or less than a lower limit value.

The compensation factor k(i) may be expressed as Equation 3.

$$k(i) = \begin{cases} \dfrac{N}{2} - i & \left(\text{if } \dfrac{N}{2} \geq i\right) \\ 0 & \left(\text{if } \dfrac{N+1}{2} = i\right) \\ \dfrac{N}{2} + 1 - i & \left(\text{if } \dfrac{N}{2} < i\right) \end{cases}$$ [Equation 3]

In Equation 3, when values of the k(i) calculated based on Equation 3 are arranged in an order of i, magnitudes of the values of the k(i) may have a bisymmetrical form. Since the values of the k(i) have the bisymmetrical form, the values of the k(i) may have bisymmetrically different signs. A total sum of the values of the k(i) may be "0."

The feedforward compensation may be calculated based on the $SOC_{diff}$ and the k(i) calculated using Equation 3. The feedforward compensation may be used to determine the output voltage $V_{ref\_i}$. Since the $SOC_{diff}$ may have a constant value without changing depending on the batteries 211 through 213, the feedforward compensation may have a characteristic identical to a characteristic of the k(i).

Thus, when values of the feedforward compensation are arranged in an order of i, magnitudes of the values of the feedforward compensation may have a bisymmetrical form. The values of the feedforward compensation may be bisymmetrical and thus, have bisymmetrically different signs. A total sum of the values of the feedforward compensation may be "0."

A total amount of power to be output from the power converters 214 through 216 may be maintained at the same amount, or substantially the same amount. Although the output voltages of the power converters 214 through 216 are determined based on the feedforward compensation, the total amount of power to be output from the power converters 214 through 216 may not increase or decrease. The total amount of power to be output from the power converters 214 through 216 may indicate a total amount of power of the batteries 211 through 213 to be transmitted to the load through the power converters 214 through 216.

For example, when a number of batteries to be balanced by the battery managing apparatus 220 is three (N=3) and four (N=4), values of the compensation factor k(i) and values of the feedforward compensation $SOC_{diff}*k(i)$ may be indicated as in Tables 1 and 2.

TABLE 1

| I | 1 | 2 | 3 |
|---|---|---|---|
| k(i) | 0.5 | 0 | −0.5 |
| $SOC_{diff} * k(i)$ | $0.5 * SOC_{diff}$ | 0 | $-0.5 * SOC_{diff}$ |

TABLE 2

| I | 1 | 2 | 3 | 4 |
|---|---|---|---|---|
| k(i) | 1 | 0 | 0 | −1 |
| $SOC_{diff} * k(i)$ | $1 * SOC_{diff}$ | 0 | 0 | $-1 * SOC_{diff}$ |

Referring to Tables 1 and 2, the total sum of the values of the k(i) may be "0." In addition, the total sum of the values of the feedforward compensation $SOC_{diff}*k(i)$ may be "0."

As described in the foregoing, when the controller 222 determines the output voltages of the power converters 214 through 216, the controller 222 may perform the following operations.

The controller 222 may control the magnitudes of the output voltages of the power converters 214 through 216 based on at least one of the SOCs and the SOHs of the batteries 211 through 213.

When an SOC of one of the batteries 211 through 213 is greater, the controller 222 may control an output voltage to be output from a power converter corresponding to the battery to increase.

The controller 222 may control a magnitude of an output voltage of a power converter connected to a corresponding battery based on an overall SOC and an overall SOH of the batteries 211 through 213, and an SOC and an SOH of the corresponding battery. The overall SOC may indicate all of the respective SOCs of the batteries 211 through 213. The overall SOH may indicate all of the respective SOHs of the batteries 211 through 213. The corresponding battery may refer to a battery corresponding to the power converter desired to be controlled by the controller 222.

The controller 222 may calculate compensation values based on a difference between a maximum value and a minimum value of the SOCs of the batteries 211 through 213. The difference between the maximum value and the minimum value of the SOCs of the batteries 211 through 213 may be restricted to allow the controlled output voltages of the power converters 214 through 216 not to be greater than the upper limit value or less than the lower limit value.

The controller 222 may set the compensation values to allow the total amount of power to be output from the power converters 214 through 216 to be maintained. The controller 222 may further set the compensation values based on an order of the magnitudes of the SOCs of the batteries 211 through 213.

A total sum of the compensation values set by the controller 222 may be "0." When the compensation values corresponding to the batteries 211 through 213 are arranged in an order of the SOCs of the batteries 211 through 213, magnitudes of the compensation values may have a bisymmetrical form. Thus, signs on a left side and a right side based on a center may differ.

The battery managing apparatus 220 may transmit control information determined by the controller 222, for example, the output voltages of the power converters 214 through 216, to the power supply apparatus 210. For example, the battery managing apparatus 220 may transmit the control information to any one of the power converters 214 through 216, for example, the power converter 214, included in the power supply apparatus 210.

The power converter 214 may be a first power converter among the power converters 214 through 216, and may therefore be indicated as a master power converter. The power converter 214 may transmit control information including output voltages of the power converter 215 and the power converter 216 to the power converter 215 and the power converter 216. The power converter 214 may control the power converters 214 through 216 included in the power supply apparatus 210 to operate in synchronization with one another. In the example of FIG. 2, a path through which the control information is transmitted is indicated by a dashed line.

Figure 3:
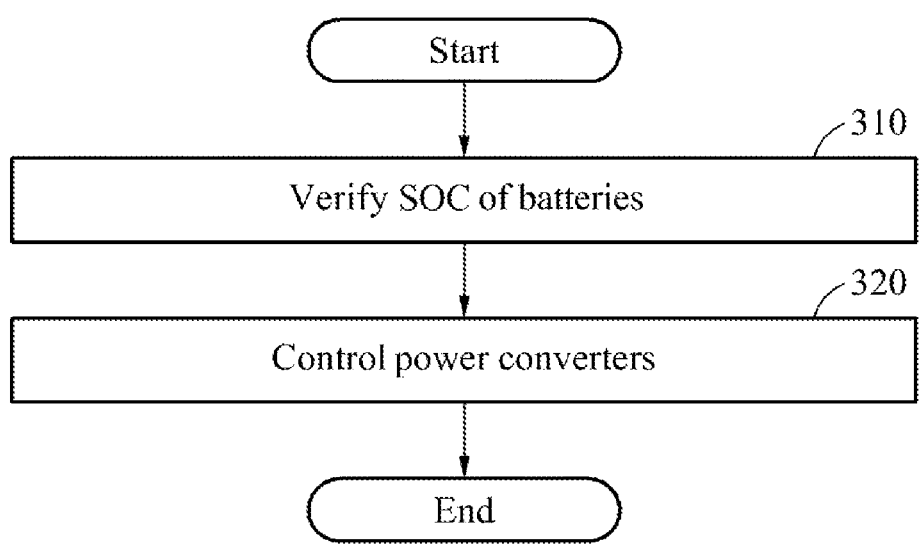
FIG. 3 is a flowchart illustrating an example battery managing method.

FIG. 3 is a flowchart illustrating an example battery managing method. The battery managing method may be performed by a processor included in a battery managing apparatus.

Referring to FIG. 3, in operation 310, the battery managing apparatus verifies respective SoCs of batteries. Further, the battery managing apparatus may verify respective SOHs and SOFs of the batteries. The batteries may be balanced by the battery managing apparatus.

In operation 320, the battery managing apparatus controls power converters that convert respective voltages of the batteries to allow a greater amount of power to be output from a battery having a greater SoC among the batteries, in comparison to an amount of power output from a battery having a lesser SoC among the batteries. More specifically, the battery managing apparatus may control output voltages of the power converters based on compensation values to be set to allow the output voltages of the power converters to be output proportionally to the SOCs of the batteries.

Figure 4:
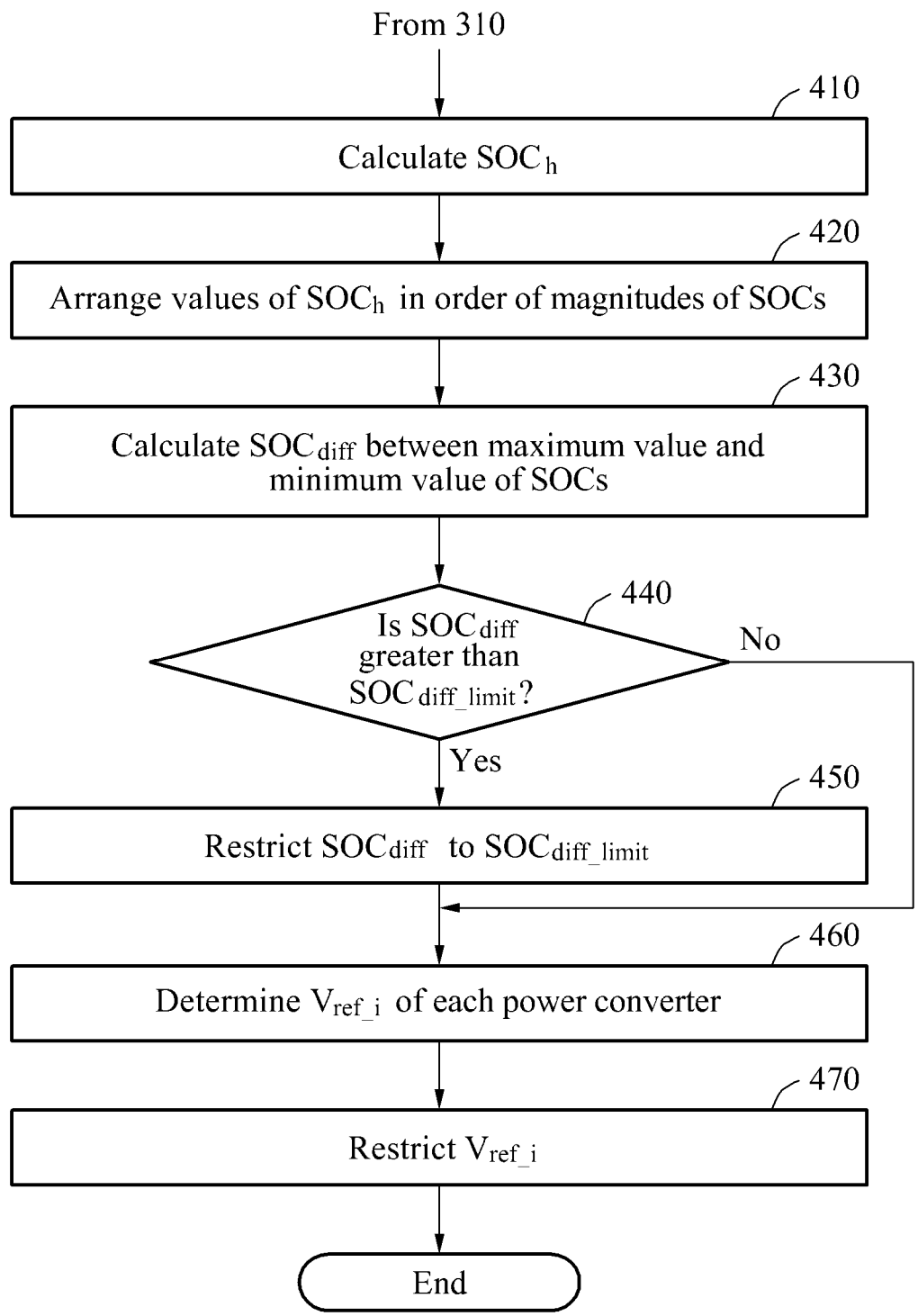
FIG. 4 is a flowchart illustrating an example method of controlling output voltages of power converters.

A detailed description of operation 320 will be provided with reference to FIG. 4.

FIG. 4 is a flowchart illustrating an example method of controlling output voltages of power converters.

Referring to FIG. 4, in operation 410, a battery managing apparatus calculates each "$SOC_h$" of batteries connected to respective power converters. The description of $SOC_h$ provided with reference to FIG. 2 may be applicable hereto and thus, repeated descriptions will be omitted here for brevity.

In operation 420, the battery managing apparatus arranges values of the $SOC_h$ in an order of magnitudes of SOCs to set "$SOC_h(i)$." For example, an $SOC_h$ having a maximum SOC among the calculated values of the $SOC_h$ may be set to be the $SOC_h(i)$.

In operation 430, the battery managing apparatus calculates a difference "$SOC_{diff}$" between a maximum value and a minimum value of the SOCs of the batteries. The $SOC_{diff}$ may be identically applied to the batteries.

In operation 440, the battery managing apparatus verifies whether the $SOC_{diff}$ is greater than an "$SOC_{diff\_limit}$." The $SOC_{diff\_limit}$ may be a threshold value that restricts output voltages of the power converters to allow the output voltages to remain within a predetermined range.

In operation 450, when the $SOC_{diff}$ is greater than the $SOC_{diff\_limit}$, the battery managing apparatus restricts the $SOC_{diff}$ to the $SOC_{diff\_limit}$. Thus, the battery managing apparatus may control the output voltages of the power converters to remain within the predetermined range. The $SOC_{diff}$ may be an element configuring a compensation value, and the compensation value may have a minus value due to a compensation factor. Thus, when the $SOC_{diff}$ has a greater value than the $SOC_{diff\_limit}$, an output voltage of a power converter controlled based on the compensation value may be less than a lower limit value of the predetermined range. To avoid such a case, the battery managing apparatus may restrict the $SOC_{diff}$ to the $SOC_{diff\_limit}$ when the $SOC_{diff}$ is greater than the $SOC_{diff\_limit}$.

In operation 460, the battery managing apparatus determines an output voltage "$V_{ref\_i}$" of each power converter that converts a voltage of each battery based on respective states of the batteries. The battery managing apparatus may determine the output voltage $V_{ref\_i}$ of each power converter based on a compensation value to be set to allow the output voltage of the power converter to be output proportionally to an SOC of each battery. The description of the $V_{ref\_i}$ provided with reference to FIG. 2 may be applicable hereto and thus, repeated descriptions will be omitted here for brevity.

In operation 470, when the output voltage $V_{ref\_i}$ determined in operation 460 deviates from the predetermined range, the battery managing apparatus restricts the output voltage $V_{ref\_i}$ to a predetermined value. For example, when the output voltage $V_{ref\_i}$ is greater than an upper limit value of the predetermined range, the battery managing apparatus may restrict the output voltage $V_{ref\_i}$ to the upper limit value.

Alternatively, when the output voltage $V_{ref\_i}$ is less than a lower limit value of the predetermined range, the battery managing apparatus may restrict the output voltage $V_{ref\_i}$ to the lower limit value.

Figure 5:
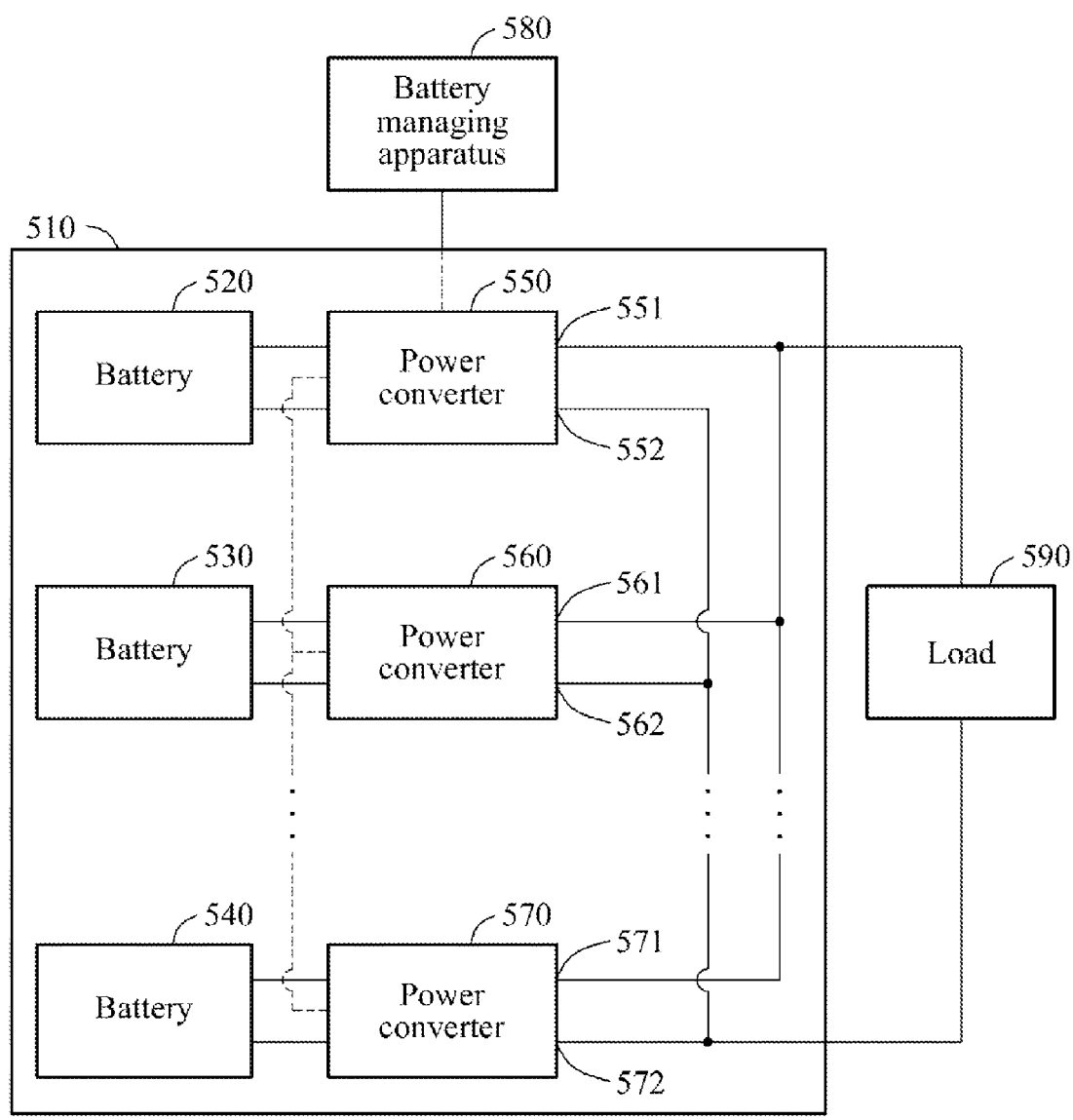
FIG. 5 is a diagram illustrating another example battery system.

FIG. 5 is a diagram illustrating another example of a battery system 500.

Referring to FIG. 5, the battery system 500 includes a power supply apparatus 510, a battery managing apparatus 580, and a load 590. The power supply apparatus 510 may be an apparatus for supplying power to the load 590, and include a plurality of batteries, for example, a battery 520, a battery 530, and a battery 540, and a plurality of power converters, for example, a power converter 550, a power converter 560, and a power converter 570.

Each of the batteries 520 through 540 may refer to a battery module or a battery cell. The battery module may include battery cells. The battery cells included in the battery module may be connected in series.

For example, each battery may be a secondary battery such as a lithium-ion battery. Capacities or voltages of the batteries 520 through 540 may be equivalent or differing.

The power converters 550 through 570 may be devices that convert respective amounts of power of the batteries 520 through 540. For example, the power converters 550 through 570 may output respective amounts of output power by converting the amounts of power of the batteries 520 through 540.

For example, as illustrated in FIG. 5, output terminals of the power converters 550 through 570 may be connected in parallel. First output terminals, for example, an output terminal 551, an output terminal 561, and an output terminal 571, may be connected in parallel and connected to a first terminal of the load 590. Second output terminals, for example, an output terminal 552, an output terminal 562, and an output terminal 572, may be connected in parallel and connected to a second terminal of the load 590. Thus, a sum of respective output currents of the power converters 550 through 570 may be transmitted to the load 590.

Respective output voltages of the power converters 550 through 570 may be equal to one another because the output terminals of the power converters 550 through 570 are connected in parallel. A voltage equal to the output voltages of the power converters 550 through 570 may be transmitted to the load 590.

The battery managing apparatus 580 may control an amount of power to be transmitted from the batteries 520 through 540 to the load 590 through the power converters 550 through 570 by controlling output currents of the power converters 550 through 570. Thus, descriptions of the output currents of the power converters 550 through 570 to be provided hereinafter may be identically applicable to descriptions of amounts of output power of the power converters 550 through 570.

The power converters 550 through 570 may output the output currents by converting the respective output currents of the batteries 520 through 540. The output currents of the power converters 550 through 570 may be controlled by the battery managing apparatus 580. The respective output currents of the power converters 550 through 570 may be equal to or different from one another.

Each of the power converters 550 through 570 may include a plurality of DC/DC converters. The DC/DC converters included in each power converter may be connected in parallel. For example, each of the DC/DC converters may be a boost converter.

The battery managing apparatus 580 may control the output currents of the power converters 550 through 570 that convert respective currents of the batteries 520 through 540 to allow an amount of power to be output from a battery having a greater SoC among the batteries 520 through 540 to increase. The battery managing apparatus 580 may control the output currents of the power converters 550 through 570 based further on compensation values to be set to allow the output currents of the power converters 550 through 570 to be output proportionally to respective SOCs of the batteries 520 through 540.

The battery managing apparatus 580 may control an output current "$I_{ref\_i}$" of a power converter as expressed in Equation 4.

$$I_{ref\_i} = \frac{SOC_h(i)}{\sum_{i=1}^{i=N} SOC_h(i)} I_{DC\_Link} + SOC_{diff} * k(i) \qquad \text{[Equation 4]}$$

The battery managing apparatus 580 may set the compensation values based on a maximum value and a minimum value of the SOCs of the batteries 520 through 540. The battery managing apparatus 580 may restrict a difference between the maximum value and the minimum value of the SOCs of the batteries 520 through 540 to allow the output currents of the controlled power converters 550 through 570 to remain within a predetermined range. The battery managing apparatus 580 may set the compensation values to allow a total amount of power to be output from the power converters 550 through 570 to be maintained at the same amount, or substantially the same amount. The battery managing apparatus 580 may set the compensation values based on an order of magnitudes of the SOCs of the batteries 520 through 540.

The battery managing apparatus 580 may control an output current of a power converter connected to a corresponding battery based on an overall SOC and an overall SOH of the batteries 520 through 540, and an SOC and an SOH of the corresponding battery. When the output currents of the power converters 550 through 570 deviate from the predetermined range, the battery managing apparatus 580 may restrict the output currents of the power converters 550 through 570 to a predetermined value.

The descriptions provided with reference to FIGS. 1 through 4 may be applicable to the battery managing apparatus 580 and thus, repeated descriptions will be omitted here for brevity. However, the descriptions of the output voltage "$V_{ref\_i}$" controlled by the battery managing apparatus described with reference to FIGS. 1 through 4 may be applicable to the output current "$I_{ref\_i}$" controlled by the battery managing apparatus 580.

According to examples described herein, there is provided a battery managing method and apparatus that may control output power of power converters based further on a compensation value to be set to allow the output power of the power converters to be output proportionally to respective SOCs of batteries and thus, increase a speed of balancing the batteries.

According to examples described herein, there is provided a battery managing method and apparatus that may effectively balance batteries and thus, improve available capacities and lifespans of the batteries.

According to examples described herein, there is provided a battery managing method and apparatus that may equalizing remaining capacities of batteries and thus, improve a total available capacity of a battery system.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery managing apparatus, comprising:
   a state verifier configured to verify respective states of charge (SoCs) of batteries to be balanced by the battery managing apparatus; and
   a controller configured to set compensation values based on a maximum value and a minimum value of the SoCs of the batteries, an order of magnitudes of the SoCs of the batteries and a number of the batteries, and to control output voltages of power converters configured to convert respective amounts of power of the batteries to allow a greater amount of power to be transmitted from a battery having a greater SoC among the batteries to a load based on the SoCs of the batteries and the compensation values.

2. The apparatus of claim 1, wherein a difference between the maximum value and the minimum value of the SOCs of the batteries is restricted to allow an amount of output power of the power converters to remain within a predetermined range.

3. The apparatus of claim 1, wherein the compensation values are set to allow a total amount of power to be output from the power converters to be maintained at a same amount.

4. The apparatus of claim 1, wherein
   the state verifier is configured to further verify respective states of health (SoHs) of the batteries; and
   the controller is configured to control a power converter, among the power converters, connected to a corresponding battery among the batteries, based on an overall SoC and an overall SoH of the batteries, and an SoC and an SoH of the corresponding battery.

5. The apparatus of claim 1, wherein output terminals of the power converters are connected in series or in parallel.

6. The apparatus of claim 1, wherein, when an amount of output power of the power converters deviates from a predetermined range, the controller is configured to restrict the amount of the output power of the power converters to a predetermined value.

7. A battery managing method to be performed by a battery managing apparatus, the method comprising:
   verifying respective states of charge (SoCs) of batteries to be balanced by the battery managing apparatus;
   setting compensation values based on a maximum value and a minimum value of the SoCs of the batteries, an order of magnitudes of the SoCs of the batteries and a number of the batteries and
   controlling output voltages of power converters configured to convert respective amounts of power of the batteries to allow a greater amount of power to be transmitted from a battery having a greater SoC among the batteries to a load based on the SoCs of the batteries and the compensation values.

8. The method of claim 7, further comprising restricting a difference between the maximum value and the minimum value of the SOCs of the batteries to allow an amount of output power of the power converters to remain within a predetermined range.

9. The method of claim 7, wherein the compensation values are set to allow a total amount of power to be output from the power converters to be maintained at a same amount.

10. The method of claim 7, wherein the verifying comprises:

further verifying respective states of health (SoHs) of the batteries; and the controlling comprises controlling a power converter, among the power converters, connected to a corresponding battery among the batteries, based on an overall SoC and an overall SoH of the batteries, and an SoC and an SoH of the corresponding battery.

11. The method of claim 7, wherein output terminals of the power converters are connected in series or in parallel.

12. The method of claim 7, wherein, when an amount of output power of the power converters deviates from a predetermined range, the controlling comprises restricting the amount of the output power of the power converters to a predetermined value.

13. A non-transitory computer-readable storage medium storing instructions that, when executed by a processor, cause the processor to perform the method of claim 7.

14. A battery managing apparatus, comprising:

a controller configured set respective compensation values for power converters corresponding to batteries based on a maximum value and a minimum value of states of charge (SoCs) of the batteries, an order of magnitudes of the SoCs of the batteries and a number of the batteries, and to control the power converters in a power supply apparatus to convert respective amounts of power of the batteries based on a comparison of respective SoCs of the batteries and the respective compensation values to allow a greater amount of power to be transmitted from a battery having a greater SoC among the batteries in order to balance the SoCs of the batteries, wherein the converted respective amounts of power of the batteries is transmitted from the batteries to a load.

15. The battery management apparatus of claim 14, wherein the respective compensation values are set such that the respective amounts of power of the batteries are proportional to the respective SOCs of the batteries.

* * * * *